UNITED STATES PATENT OFFICE.

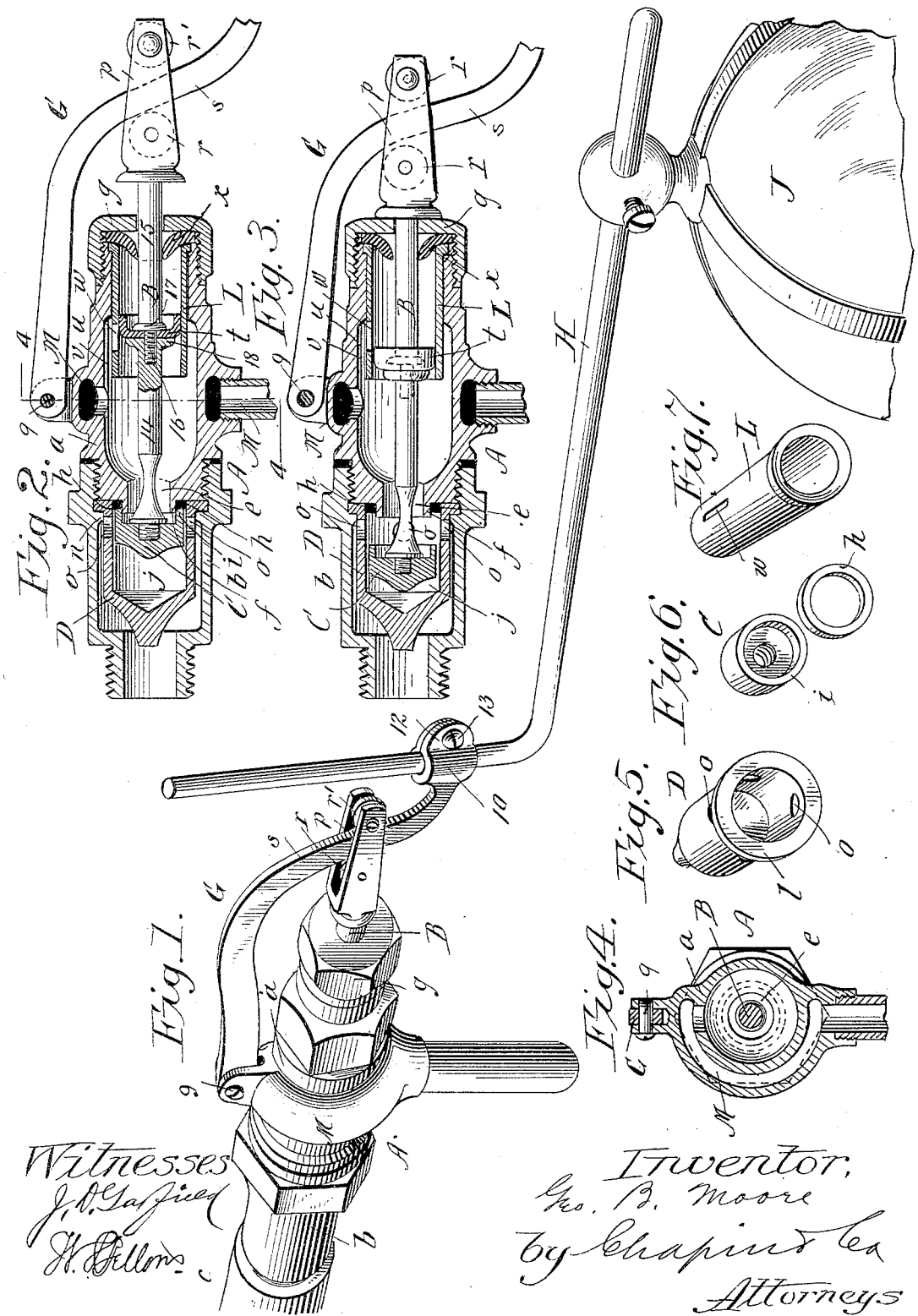

GEORGE B. MOORE, OF SPRINGFIELD, MASSACHUSETTS, ASSIGNOR OF TWO-FIFTHS TO JOHN V. GLOVER, OF SAME PLACE.

VALVE.

SPECIFICATION forming part of Letters Patent No. 459,044, dated September 8, 1891.

Application filed January 28, 1891. Serial No. 379,404. (No model.)

*To all whom it may concern:*

Be it known that I, GEORGE B. MOORE, a citizen of the United States, residing at Springfield, in the county of Hampden and State of Massachusetts, have invented new and useful Improvements in Valves, of which the following is a specification.

This invention relates to improvements in valves, especially that class known as "ball-cocks," although certain features of the invention are applicable to valves of other descriptions.

The principal objects of the invention are the provision of means interposed between the float and valve-stem for insuring an easy opening of the valve against the water-pressure, which pressure normally serves to maintain the valve closed, and said means also assisting in the closing of the valve when the float rises; the provision of means for insuring at the proper time or under the proper conditions a slow closing of the valve and against a water check or cushion, and the provision of a construction whereby the parts of the valve when assembled shall be most compact and effective against leakage, and yet which may be readily disconnected for the purpose of repairs or renewal of the packing.

To these ends the invention consists in the construction and combination of parts, all substantially as will hereinafter more fully appear, and be set forth in the claims.

Reference is to be had to the accompanying drawings, in which—

Figure 1 is a perspective view of the ball-cock. Fig. 2 is a vertical section of the valve, shown as closed, a part only of the operating and ball-carrying arm being shown. Fig. 3 is a section similar to Fig. 2, but showing the valve as opened. Fig. 4 is a vertical cross-section on the line 4 4, Fig. 2. Figs. 5, 6, and 7 are perspective views of parts or details hereinafter more particularly referred to.

In the drawings, A represents the body of the valve, of a general cylindrical form, said body being necessarily, for the proper assemblage of the parts, made in two casing-sections $a$ and $b$, the one having a screw-threaded engagement with the other. The section $b$ has its end screw-threaded or is otherwise adapted to be coupled with the supply-pipe $c$, while the forward end of the section $a$ is inclosed by the cap $g$, which screw engages said section, as shown. The rear end of casing-section $a$ has the contracted opening $e$, which is surrounded by the annular lip $f$, and at the base of said lip is a packing-ring $h$, of rubber or other suitable material.

B represents the valve-stem, which plays through an opening therefor centrally in the said cap $g$, and at its rear end it carries the valve C, which is of a general cylindrical form and which has an annular lip or rib $i$ at its forward end to rest upon the valve-seat constituted by said packing-ring $h$. The valve is held against its seat and closed under normal conditions by the pressure of the water against the rear side thereof. In this valve no springs are employed. It will be observed, however, that the valve plays in a supplemental chamber $j$, which is within the chambered section $b$, said supplemental chamber being formed by the shell D. This shell is of conical form and closed at its rear end, and forward thereof it is of an external diameter somewhat less than that of the chamber in the section $b$, and said shell is held axially within said section $b$ by the outwardly-extended flange $l$, which is in confinement between the end of section $a$ and the internal seat or shoulder $n$ on the section $b$. The said shell is of course open at its forward end and has ports $o$ through its sides at suitable intervals. The water from the supply when the valve is open, necessarily first impinging against the conical rear end of the shell D, then passing into the annular space between said shell and the inner wall of casing-section $b$, and then radially through the ports inward to the supplemental chamber, wherein the valve plays, becomes divided in its volume and where the pressure is excessive permits greater freedom in the opening of the valve. The valve-stem at its forward end is forked, as at $p$, carrying between the members thereof the rollers $r$ and $r'$, suitably separated.

G represents an arm which is pivotally connected at 9 on the top of casing-section $a$, and continuing forward more or less nearly horizontally for a short distance, then inclines downwardly in the oblique section s, which passes within the forked portion of the valve-stem and between the said friction-rollers r r'. This arm carries the secondary arm H. The connection of one of said arms with the other and also the adjustment of the one upon the other are insured by the provision of the split hub 10 with the ear-pieces 12 and the binding-screw 13. The secondary arm carries the ball-float J. The inclined portion s of the arm G exerts a forcing or cam action against the roller r as the ball-float lowers, forcing the valve-stem rearwardly in the line of its axis, while as the ball-float rises and the arm G is swung upwardly the upper edge of the inclined portion of the arm acts against the forward roller r' and also then exerts positively such a cam action as to force the valve-stem forwardly and the valve to its seat, the pressure not being depended on to entirely effect the closing of the valve.

An intermediate portion of the valve-stem B is provided with an outwardly-extended circular packing t, which fits closely and plays within the sleeve L, which is held in place within the forward chambered portion of the casing-section a of the valve. As shown, the valve-stem is formed in two sections 14 and 15, the one screwing by the spindle-like portion 16 thereof into the end of the other portion, the adjacent uniting ends of the valve-stem sections 14 and 15 having the flanges or enlargements 18 18, which serve to clamp, when said sections are securely united, the piston-like part or packing t between them. Said packing t, as shown, is of cup shape, with its upturned annular edge toward the forward end of the valve.

A suitable portion of the casing-section a is cored out, as at u, so as to leave between the inner wall of said casing-section and a portion of the external wall of said sleeve an annular space, and there is a port w leading through the side of said sleeve, whereby communication may be had, when the valve-stem is forced inwardly to open the valve, between the main chamber in casing-chamber a and the chamber within the sleeve, which is forward of said cup-shaped packing, which, under the opening and closing of the valve, reciprocates as a piston with the valve-stem. At the time the valve is closed, as seen in Fig. 2, the forward edge of said cup-shaped packing or piston t lies just at or slightly forward of the forward boundary of the said port.

M represents the outlet-opening for the valve, the same leading from the chamber in the casing-section a. As preferably formed and arranged and as particularly shown, the said outlet-passage M leads from the top of the chamber in section a, thence continuing down and around the body of said section, being preferably constructed as a duct within the side of the wall integrally formed in the casting, in a manner practicable by brass-founders.

By having the discharge from the chambered section a leading out of the top thereof, as shown, the said chamber acts as a trap, being always retained substantially full of water, even when the valve is closed, and especially as is necessary when the valve is closing and just previous to its entire closure, for thereby there will be an entrance through the port w in the thimble, and to the advance of the piston-packing t to fill the sleeve forward of said piston-packing and thereby to constitute a water-cushion against which the said piston-packing must work, and consequently to insure a slow closing of the valve without any liability of the parts jumping or clattering or of there being the annoyance occasioned by a water-hammer against the valve.

Inside of the cap g and between it and the forward end of the sleeve L is placed a packing x, which is more or less of a conical form with its apex rearward, the apex of the said packing member being cut out, leaving the central portion of this packing as a perforation, through which the valve-stem passes with a close fit, and by this packing, formed and applied as described and shown, a most effectual water-tight closure of the valve at its forward end is secured.

What I claim as my invention is—

1. In a ball-cock, the combination, with the valve-stem having the forked extremity and provided and supported between the members thereof with the roller r, of a suitably sustained and pivoted ball-carrying arm having a portion inclined relative to the length of the valve-stem and having an engagement with the said roller and operating as a cam thereon as the said arm lowers to force the valve-stem inward, substantially as and for the purpose set forth.

2. In a ball-cock, the combination, with the valve-stem having the forked extremity and provided with separated abutments, as the rolls r r', of a suitably sustained and pivoted ball-carrying arm having a portion inclined to the length of the valve-stem and by such portion passed between said rolls or abutments on the valve-stem and operating on being swung downwardly as a cam to force the valve-stem inward and on the upward swing of the arm to positively assist in the closing of the valve, substantially as described.

3. In a ball-cock valve, in combination, a chambered valve body or casting having an inlet-opening and provided with a duct which extends within the wall thereof from the top of the casting around the side thereof and terminating under the valve-body in the downwardly-directed outlet tube or nozzle, a port leading from the top of the main valve-chamber to said duct, a valve-stem movable within said casting and having a valve adapted to close said opening, a supplemental or water-catch chamber having a port which is in communication with the main chamber of the valve, and a piston on the valve-stem movable in said supplemental chamber to be water-cushioned or retarded as the valve closes, substantially as described.

4. In a valve, in combination, a casing or chambered body having an opening *e* thereinto and a valve-seat thereat and an outlet-opening and having its end opposite the inlet-opening externally screw-threaded, a shouldered sleeve entered and supported within the said latter-named end of the valve-casing, provided with the port *w*, there being between an inner portion of said sleeve comprising said port and the interior of the casing an annular space *u*, the valve-stem provided with a valve for closing the said valve-seat and extending through the said sleeve and beyond the valve-body and provided with a piston fitting within the sleeve, and a cap *g*, and packing applied on the threaded end of said casing, substantially as described.

5. In a ball-cock valve, the combination, with the valve-stem, of a lever G, by one end pivotally mounted on the valve-body and having a suitable portion which engages said valve-stem for moving the latter as said lever is swung and provided with a hub 10, the lever H, for carrying the float, having an angularly-extended arm which is adjustably movable through the said hub, and means for confining the said arm on the lever G, substantially as described.

6. In a valve, in combination, a body suitably chambered and provided at an intermediate portion within same with the contracted opening *e* and the valve-seat thereat, the shell D, supported within the chambered body between said valve-seat and the water-inlet, there being an annular space between said shell and the internal walls of the valve-body, said shell having a conical rear end and provided with a radial port *o*, and the valve-stem provided with the valve C, which is disposed and movable within said shell, substantially as and for the purpose set forth.

7. In a valve, in combination, the chambered body consisting of sections *a* and *b*, the former having the contracted opening *e* through its rear end and provided with the valve-seat thereabout and said section at its rear end portion being externally screw-threaded, the section *b* having a water-supply opening at its rear end and being internally screw-threaded at its forward portion and provided with the shoulder *n*, the shell D, provided with the flange *l*, the ports *o*, and the conical rear end, and the valve-stem and valve C, substantially as described and shown.

8. In a valve, in combination, the chambered body consisting of sections *a* and *b*, the section *a* having the contracted opening *e* at its rear end and a suitable valve-seat thereat, the outlet-conduit M, leading from the top thereof, the screw-threaded forward extremity, the sleeve L, provided with a port *w*, the packing *x*, and the cap *g*, the section *b* screw-engaging said section *a* and having an opening adapted to be put in communication with the water-supply and having the shell D supported therein which has the ports *o o*, and the valve-stem formed by the screw-united sections 14 and 15, confining between them the piston *t*, and said stem carrying at its rear end the valve C, all substantially as described, and for the purposes set forth.

GEORGE B. MOORE.

Witnesses:
 H. A. CHAPIN,
 G. M. CHAMBERLAIN.